(12) United States Patent
Sakaguchi

(10) Patent No.: US 12,713,997 B2
(45) Date of Patent: Aug. 25, 2026

(54) WORK VEHICLE

(71) Applicant: Yanmar Holdings Co., Ltd., Osaka (JP)

(72) Inventor: Yuki Sakaguchi, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 490 days.

(21) Appl. No.: 18/218,536

(22) Filed: Jul. 5, 2023

(65) Prior Publication Data

US 2024/0008384 A1 Jan. 11, 2024

(30) Foreign Application Priority Data

Jul. 7, 2022 (JP) ................................ 2022-109652

(51) Int. Cl.
*A01B 76/00* (2006.01)
*A01B 69/04* (2006.01)

(52) U.S. Cl.
CPC ............ *A01B 69/008* (2013.01); *A01B 76/00* (2013.01)

(58) Field of Classification Search
CPC .............................. A01B 69/008; A01B 76/00
USPC .................................................. 180/443, 444
See application file for complete search history.

(56) References Cited

U.S. PATENT DOCUMENTS 9,051,006 B2 * 6/2015 Reed ...................... B62D 1/286

FOREIGN PATENT DOCUMENTS

| | | | | |
|---|---|---|---|---|
| CN | 111791948 A | * 10/2020 | | B62D 5/0496 |
| JP | S62255274 A | 11/1987 | | |
| JP | 2005138606 A | 6/2005 | | |
| JP | 2019126281 A | * 8/2019 | | |
| JP | 7030540 B2 | 3/2022 | | |
| KR | 20090039360 A | * 4/2009 | | F16H 57/02 |

OTHER PUBLICATIONS

Notice of Reasons for Refusal: Patent Application No. JP2022-109652, Date Proposed: Nov. 27, 2025.

* cited by examiner

*Primary Examiner* — Jacob D Knutson
(74) *Attorney, Agent, or Firm* — Chris Mizumoto

(57) ABSTRACT

An exemplary work vehicle includes: a steering wheel; an automatic steering mechanism that enables an automatic steering of the steering wheel; and a heat supply unit so provided as to supply heat to the automatic steering mechanism.

11 Claims, 10 Drawing Sheets

WORK VEHICLE

CROSS-REFERENCE

This application claims foreign priority of JP2022-109652, filed Jul. 7, 2022, the disclosure of which is hereby incorporated by reference in its entirety

TECHNICAL FIELD

The present invention relates to a work vehicle.

BACKGROUND ART

A conventional work vehicle having an automatic steering mechanism for performing the automatic steering of the vehicle body is known (see, for example, Patent Document 1). The automatic steering mechanism disclosed in Patent Document 1 is equipped with a steering motor and a gear mechanism. The steering motor is a motor that can control the rotation direction, rotation speed, rotation angle, etc. based on the vehicle body's position. The gear mechanism includes a gear that is provided at the steering shaft and that rotates together with the steering shaft and a gear that is provided at a rotary shaft of the steering motor and that rotates together with the rotary shaft. Rotating of the rotary shaft of the steering motor causes the steering shaft to automatically rotate via the gear mechanism.

PRIOR ART DOCUMENT

Patent Document

Patent Document 1: Japanese Patent No. 7030540

SUMMARY OF INVENTION

Technical Problem

By the way, a gear case that cases the gear mechanism is filled with grease for lubricating the gear. There is a concern that, in a low temperature environment, the viscosity of the grease increases, thus increasing a steering force (motor torque) thereby to lower an operability. Further, it is deemed that in view of the increase in motor torque in the low temperature environment, the automatic steering function, in the low temperature environment, is disabled so as to protect the steering motor. In this case, however, there is a concern about a reduced convenience.

In view of the above, it is an object of the present invention to provide a technology that can improve a convenience of a work vehicle having an automatic steering function.

Solution to Problem

An exemplary work vehicle of the present invention includes: a steering wheel; an automatic steering mechanism that enables an automatic steering of the steering wheel; and a heat supply unit so provided as to supply heat to the automatic steering mechanism.

Advantageous Effects of Invention

The exemplary present invention can improve the convenience of the work vehicle having an automatic steering function can.

DESCRIPTION OF EMBODIMENTS

Embodiments of the present invention are to be described with reference to the drawings. Further, in the present embodiment, an example in which a work vehicle is a tractor is to be described. The work vehicle, however, may be a work vehicle other than the tractor, such as various harvesters, rice planters, combine harvesters, civil engineering and construction work machines, snow plow trucks, etc.

Further, in the present specification, directions are defined as follows. First, the direction in which the tractor as the work vehicle proceeds during work is defined as "front" and the opposite direction is defined as "rear". Further, the right side of a proceeding direction of the tractor is defined as "right" and the left side of the same is defined as "left". A direction perpendicular to a front-rear direction and left-right direction of the tractor is defined as an up-down direction. In this case, the gravity direction is defined as down, and the opposite direction is defined as up. Note that the directions described above are designations used merely for explanation, and are not intended to limit the actual positional relation and actual direction.

1. OVERVIEW OF WORK VEHICLE

Figure 1:
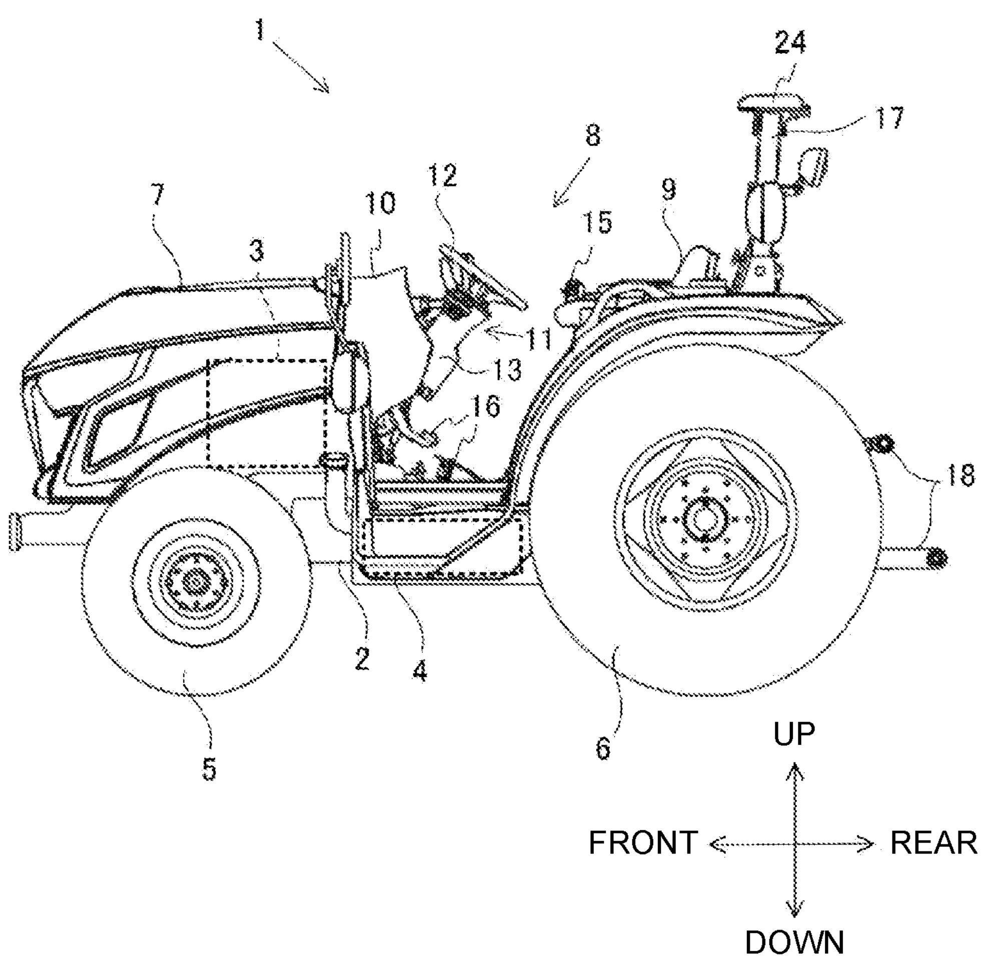
FIG. 1 is a side view showing a schematic configuration of a tractor.

FIG. 1 is a side view of a schematic configuration of a tractor 1 according to an embodiment of the present invention. As shown in FIG. 1, the tractor 1 includes a vehicle body 2, an engine 3, and a transmission case 4.

A pair of right and left front wheels 5 are placed in a front part of the vehicle body 2. A pair of right and left rear wheels 6 are placed on a rear part of the vehicle body 2. The vehicle body 2 can run by the front wheels 5 and the rear wheels 6. That is, the tractor 1 of the present embodiment is a wheel tractor. However, the tractor 1 is not limited to the wheel tractor, and may also be a crawler tractor or the like.

The engine 3 is placed in the front part of the vehicle body 2 in a manner to be hooded by a hood 7. The engine 3 is a drive power source of the tractor 1. Further, the tractor 1 may be driven by another drive source, such as an electric motor, instead of the engine.

The transmission case 4 is placed behind the engine 3 and below a drive unit 8. A power transmission unit (not shown) is placed inside the transmission case 4. Via the power transmission unit inside the transmission case 4, rotary power of the engine 3 is transmitted to at least one of the front wheel 5 and the rear wheel 6.

The drive unit 8 is provided behind the engine 3 in the vehicle body 2. The driver (operator) gets on the drive unit 8. The drive unit 8 has a drive seat 9 and a front panel 10. The driver sits on the drive seat 9. The front panel 10 is placed in front of the drive seat 9. The front panel 10 is equipped with a steering 11. That is, the steering 11 is placed in front of the drive seat 9. The front panel 10 is also equipped with a meter display unit and the like to show a speed of the tractor 1.

The steering 11 includes a steering wheel 12, a steering column 13, and a steering shaft 14 (see FIG. 2, etc. below). That is, the tractor 1 has the steering wheel 12, the steering column 13, and the steering shaft 14. The steering wheel 12 is operated by the driver seated on the drive seat 9. The steering column 13 covers the steering shaft 14. The steering shaft 14 supports the steering wheel 12. The steering wheel 12 and the steering shaft 14 are rotatably supported by a steering part (not shown) placed in the steering column 13. The steering shaft 14 is columnar in shape and extends at an angle, tilting, relative to an up-down direction, in a direction where an upper part is behind a lower part, and extending diagonally. The steering wheel 12 is connected to an upper end part of the steering shaft 14. Turning the steering wheel 12 can change the direction of the front wheels 5.

The drive unit 8 is further equipped with various operation levers 15 and pedals 16 which are operated by the driver, for example. The various operation levers 15 may include a main shift lever, a subsidiary shift lever, and a work lever, for example. Further, the various pedals 16 may include an accelerator pedal, a brake pedal, and a clutch pedal, for example.

In the present embodiment, a roll-over protection structure frame 17 (hereinafter, ROPS frame 17) is provided behind the drive seat 9. The ROPS frame 17 allows the tractor 1, when being overturned, to protect the driver. Further, the tractor 1 may have a cabin specification in which the drive seat 9 is covered by a cabin, instead of a ROPS specification in which the ROPS frame 17 is provided.

A work machine connection part 18 including a three-point link mechanism, etc. is provided at the rear part of the vehicle body 2. A work machine can be mounted to the work machine connection part 18. The work machine may be, for example, a tiller unit, a plough, a fertilizing unit, an agricultural chemicals splaying unit, a harvesting unit, or a reaping unit. An up-down unit (not shown) with a hydraulic unit such as an up-down cylinder is provided in the rear part of the vehicle body 2. The up-down unit ups and downs the work machine connection part 18, thereby making it possible to up and down the work machine. Further, via the transmission case 4 and a power take-off shaft (PTO shaft; not shown) which is placed in the rear part of the vehicle body 2, the power generated by the engine 3 can be transmitted to the work machine connected by the work machine connection part 18.

In the present embodiment, the tractor 1 has an automatic steering function in which steering is so performed autonomously as to follow a given route. That is, the tractor 1 is so provided as to be able to run either with manual steering, in which the driver operates the steering wheel 12, or with the automatic steering. FIG. 2 is a block diagram showing a configuration related to the automatic steering function of the tractor 1 according to the present embodiment. Further, the tractor 1 may be configured to autonomously perform, in addition to the steering, at least one of controlling of a vehicle speed and the work by the work machine.

Figure 2:
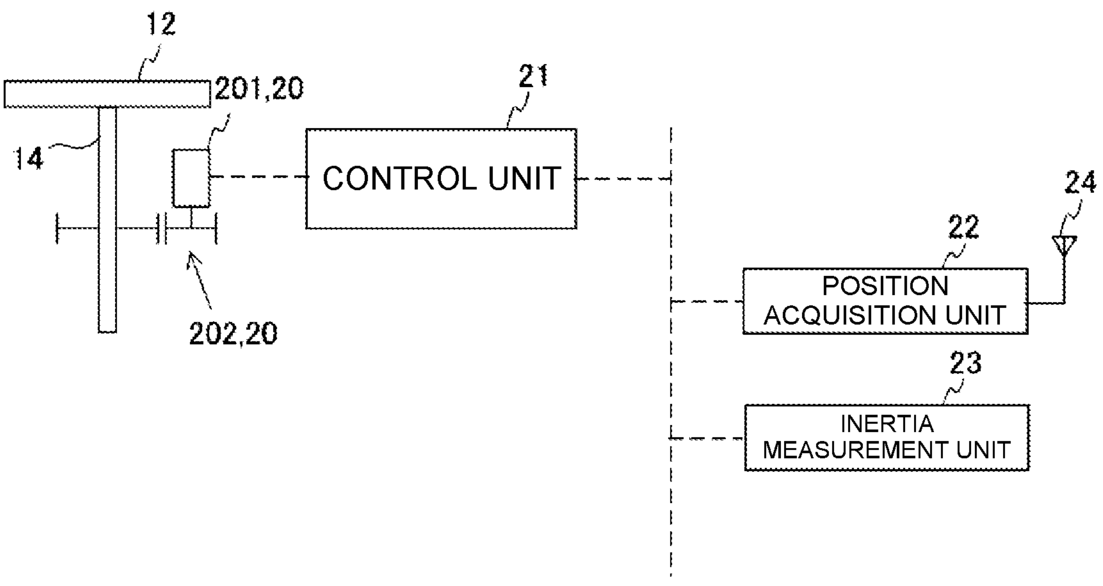
FIG. 2 is a block diagram showing a configuration related to an automatic steering function of the tractor.

As shown in FIG. 2, the tractor 1 is equipped with an automatic steering mechanism 20 that enables the automatic steering of the steering wheel 12. The automatic steering mechanism 20 has a motor 201 and a gear mechanism 202. The gear mechanism 202 transmits the rotary power of the motor 201 to the steering shaft 14. The motor 201 is so provided as to control a rotation direction, rotation speed, rotation angle, etc. Rotating of an output shaft of the motor 201 causes the steering shaft 14 to automatically rotate via the gear mechanism 202. That is, driving of the motor 201 can cause the steering wheel 12 to automatically turn. Further, details of the gear mechanism 202 are to be described below. Further, in the present embodiment, the motor 201 and the gear mechanism 202 are placed in the steering column 13.

Further, as shown in FIG. 2, the tractor 1 includes a control unit 21. The control unit 21 is a computer including, for example, an arithmetic unit, an input/output unit, and a storage unit. The arithmetic unit is, for example, a processor or a microprocessor. The storage unit is a main memory such as a ROM (Read Only Memory) and a RAM (Random Access Memory). The storage unit may further include an auxiliary storage unit such as an HDD (Hard Disk Drive) or an SSD (Solid State Drive). Various programs, data and the like are stored in the storage unit. The arithmetic unit reads out various programs from the storage unit and performs an arithmetic process which accord to the programs.

Further, there may be a single or multiple control units 21. In the case of more than one control unit 21, the configuration should be such that the multiple control units can communicate with each other.

The control unit 21 performs control related to the automatic steering. That is, the control unit 21 functions as a controller for the automatic steering. The control unit 21 is electrically connected to the motor 201 thereby to control the motor 201. The motor 201 is driven when being supplied with electric power determined by the control unit 21. As described above, since a drive force of the motor 201 is transmitted via the gear mechanism 202 to the steering shaft 14, controlling the motor 201 can control the steering wheel 12. In other words, controlling the motor 201 can control the direction of the front wheel 5.

In the present embodiment, the control unit 21 is electrically connected to a position acquisition unit 22 and an inertia measurement unit 23.

The position acquisition unit 22 uses a positioning signal received by a positioning antenna 24 from a positioning satellite, thereby to acquire the tractor 1's position as latitude and longitude information, for example. To the control unit 21, the position acquisition unit 22 outputs position information of the tractor 1. The position acquisition unit 22, after receiving the positioning signal from a base station (not shown) in a proper method, may perform the positioning using, for example, a known RTK-GNSS (Real Time Kinematic GNSS) method. Further, the position acquisition unit 22 may perform the positioning using the DGNSS (differential GNSS) method, for example.

The inertia measurement unit 23 includes a 3-axis angular speed sensor and a 3-way acceleration sensor. The inertia measurement unit 23 outputs measured information to the control unit 21. Providing the inertia measurement unit 23 makes it possible to measure inertia information such as a yaw angle, a pitch angle, and a roll angle of the vehicle body 2. The control unit 21, in response to an instruction from the operator (driver or the like) having used an operation unit (not shown), performs a start or end process of the automatic steering. Further, the control unit 21 seeks the position and direction of the vehicle body 2 of the tractor 1 based on information acquired from the position acquisition unit 22 and inertia measurement unit 23, for example. Further, the control unit 21, in response to a relation between the sought vehicle body 2's position and the given automatic run route, performs a calculation related to the automatic steering, thereby to control the motor 201. Further, the control unit 21 performs the next calculation (calculation for feedback control) according to action information of the motor 201.

Figure 3:
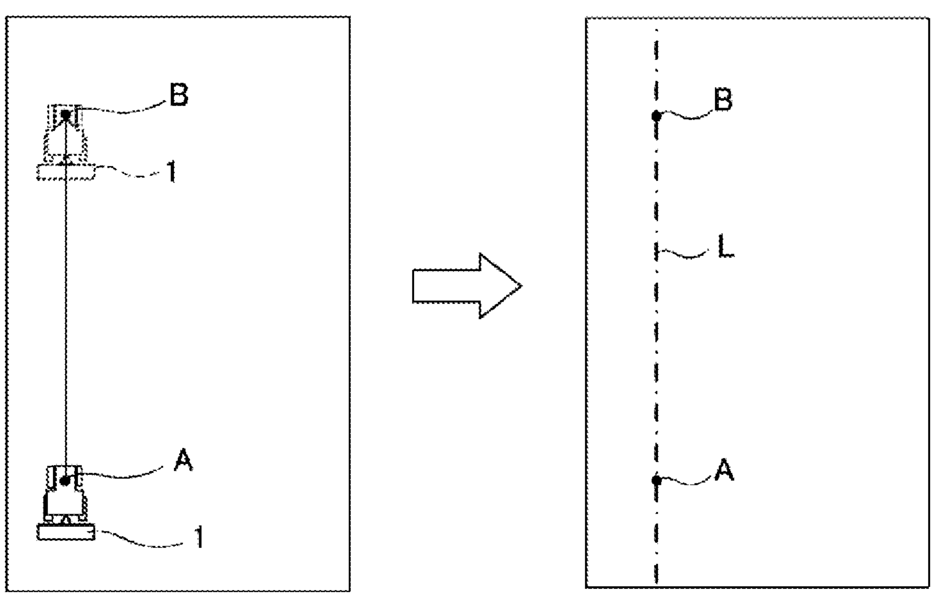
FIG. 3 is a view for explaining an example of a setting method of a reference line.

Here, the automatic steering, which is performed by the tractor 1 according to the present embodiment, is described in brief below. For performing the automatic steering, a reference line L is first set. FIG. 3 is a view for explaining an example of a setting method of the reference line L. The setting method of the reference line L may be a method other than the method shown in FIG. 3.

For setting the reference line L, the tractor 1 is first moved to a proper place in the farm field (point A in the drawing), and the point A is registered. The point A is registered by the driver's instruction to resister the point A. The vehicle body 2's position acquired by the position acquisition unit 22 at a time point when the instruction to register the point A is issued is registered as the position of the point A.

Once the point A is registered, the driver manually operates the tractor 1 to move forward up to a given position (point B in the drawing). Then, the tractor 1 reaching the given position registers the point B. The point B is registered by the driver's instruction to resister the point B. The vehicle body 2's position acquired by the position acquisition unit 22 at a time point when the instruction to register the point B is issued is registered as the position of the point B. Once the points A and B have been registered, a straight line passing through the points A and B is set as the reference line L.

Once the reference line L has been set, a line parallel to the reference line L is generated as an automatic run line at a given interval. During the automatic steering, the tractor 1's steering control in a proceeding direction is so performed that the vehicle body 2's position acquired by the position acquisition unit 22 is consistent with the automatic run line. The tractor 1's steering control in the proceeding direction is performed by controlling the motor 201.

2. DETAILED EXAMPLE OF AUTOMATIC STEERING MECHANISM

Figure 4:
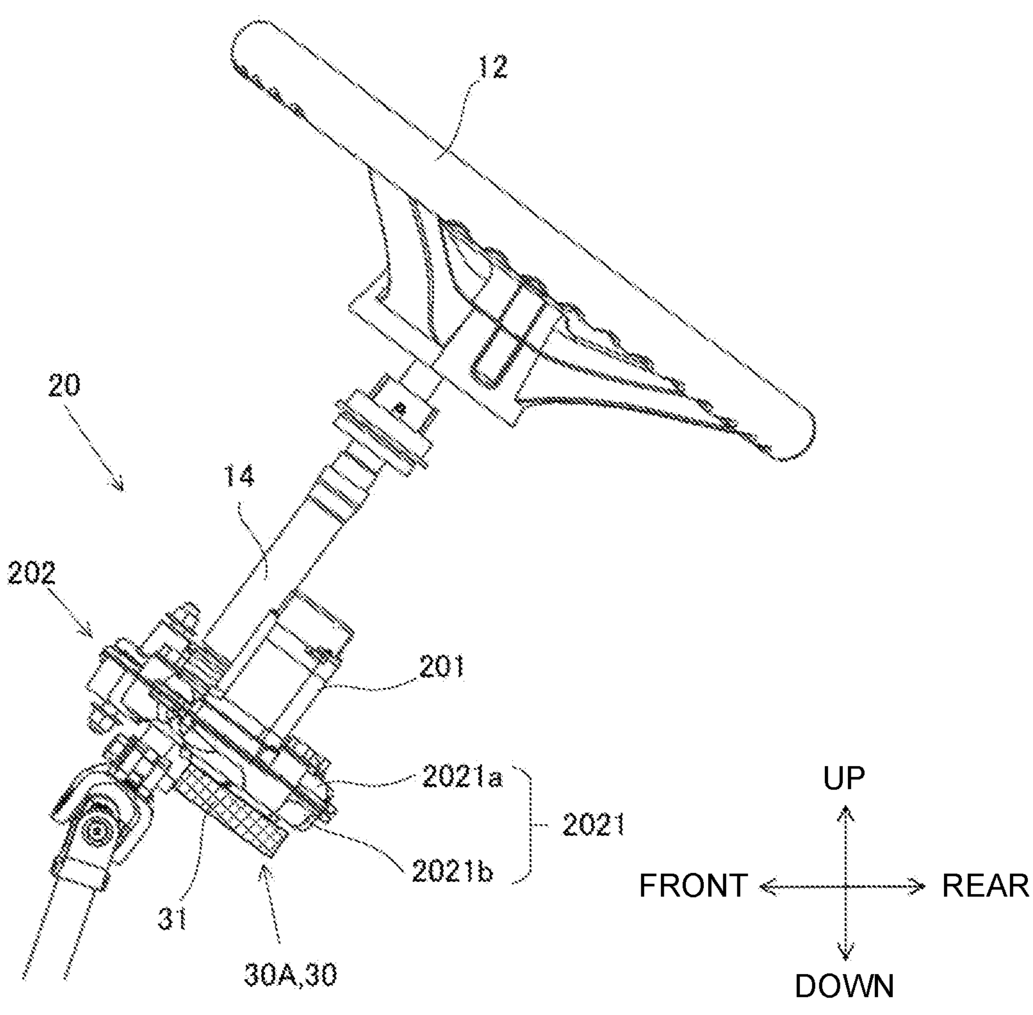
FIG. 4 is a side view showing configurations of and around an automatic steering mechanism.

FIG. 4 is a side view of configurations of and around the automatic steering mechanism 20 provided in the tractor 1 according to the present embodiment. As shown in FIG. 4, the gear mechanism 202 included in the automatic steering mechanism 20 has a gear case 2021.

The gear case 2021, in the steering column 13, is supported by a support member (not shown). The gear case 2021 supports the steering shaft 14 with a rotation. In the present embodiment, the gear case 2021 has an upper case 2021*a* and a lower case 2021*b*. The upper case 2021A and the lower case 2021B are overlapped each other, and are secured using fixtures such as a bolt and a nut. A plurality of gears 2022 (see FIG. 5 below) possessed by the gear mechanism 202 is placed in an inner space created by overlapping the upper case 2021*a* with the lower case 2021*b*.

Further, the motor 201 is fixed to the upper case 2021*a*, and is placed mostly outside of the upper case 2021*a*. An output shaft 2011 of the motor 201 (see FIG. 5 below) protrudes into the gear case 2021.

Figure 5:
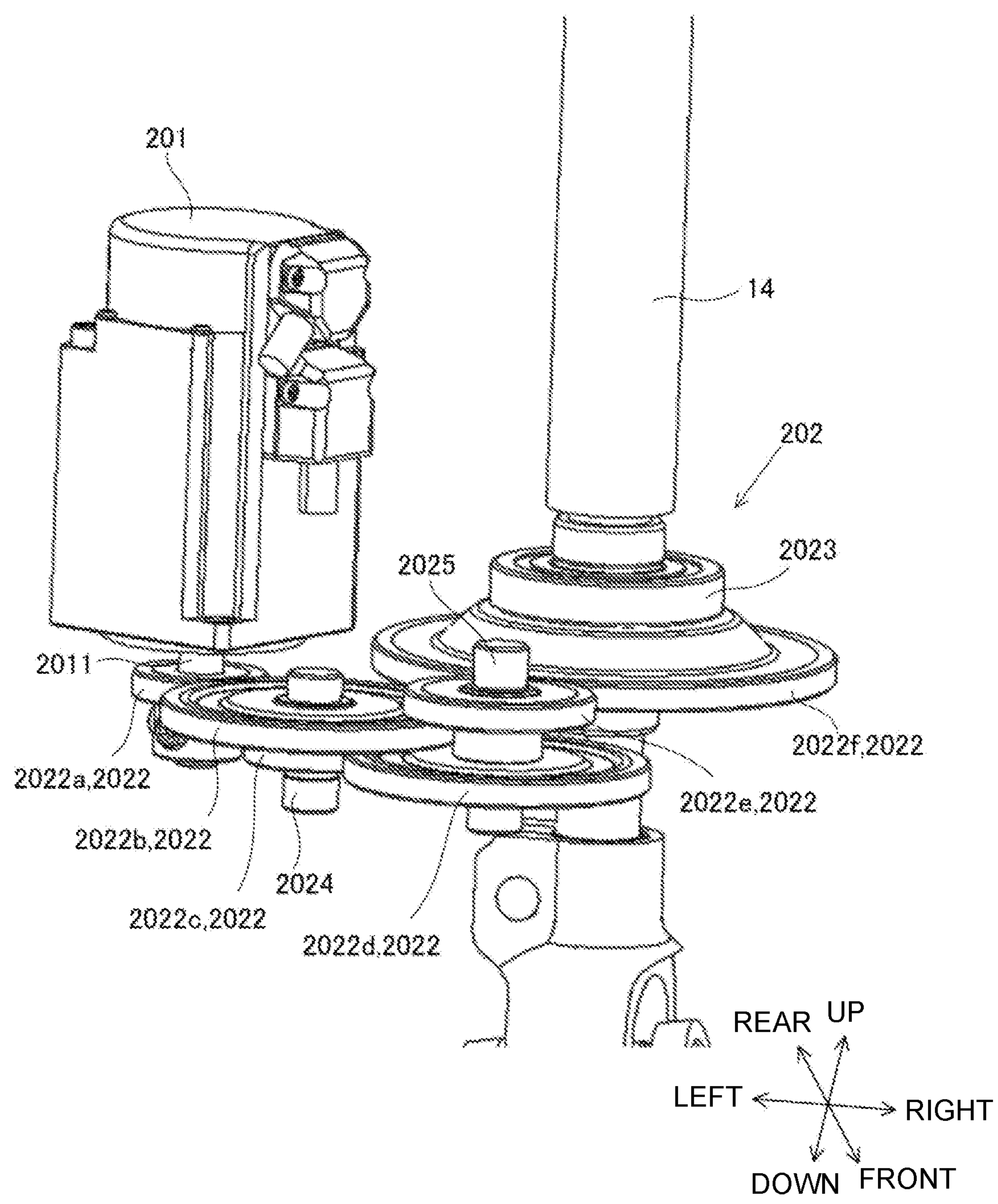
FIG. 5 is a perspective view showing a schematic configuration of a gear mechanism with a gear case removed.

FIG. 5 shows a perspective view of a schematic configuration of the gear mechanism 202 with the gear case 2021 removed. Note that FIG. 5 also includes an element other than the gear mechanism 202. As shown in FIG. 5, a shaft bearing 2023, which is fixed to the gear case 2021, is placed in the gear case 2021. The steering shaft 14 is rotatably supported by the gear case 2021 via the shaft bearing 2023. As shown in FIG. 5, two rotary shafts 2024 and 2025, which are rotatably supported by a bearing (not shown) fixedly placed in the gear case 2021, are placed in the gear case 2021.

As shown in FIG. 5, the gear mechanism 202 includes a plurality of gears 2022. The plurality of gears 2022 includes a first gear 2022*a*, a second gear 2022*b*, a third gear 2022*c*, a fourth gear 2022*d*, a fifth gear 2022*e*, and a sixth gear 2022*f*.

The first gear 2022*a* is mounted to the output shaft 2011 of the motor 201, and rotates together with the output shaft 2011. The second gear 2022*b* is mounted to the first rotary shaft 2024, and rotates together with the first rotary shaft 2024. The second gear 2022*b* meshes with the first gear 2022*a*. That is, rotating of the first gear 2022*a* also rotates the second gear 2022*b*. The third gear 2022*c* is mounted to the first rotary shaft 2024 same as that of the second gear 2022*b*, and rotates together with the first rotary shaft 2024. That is, rotating of the second gear 2022*b* also rotates the third gear 2022*c*.

The fourth gear 2022*d* is mounted to the second rotary shaft 2025, and rotates together with the second rotary shaft 2025. The fourth gear 2022*d* meshes with the third gear 2022*c*. That is, rotating of the third gear 2022*c* also rotates the fourth gear 2022*d*. The fifth gear 2022*e* is mounted to the second rotary shaft 2025 same as that of the fourth gear 2022*d*, and rotates together with the second rotary shaft 2025. That is, rotating of the fourth gear 2022*d* also rotates the fifth gear 2022*e*. The sixth gear 2022*f* is mounted to the steering shaft 14, and rotates together with the steering shaft 14. The sixth gear 2022*f* meshes with the fifth gear 2022*e*. That is, rotating of the fifth gear 2022*e* also rotates the sixth gear 2022*f*. As can be seen from the above, driving the motor 201 thereby to rotate the output shaft 2011 transmits a rotary force via a plurality of gears 2022 to the steering shaft 14, thus rotating steering shaft 14.

3. HEAT SUPPLY UNIT

The gear case 2021, which cases a plurality of gears 2022, is filled with grease (not shown) so as to lubricate the gear 2022. The viscosity of the grease tends to increase in a low temperature environment, and the increase in viscosity of the grease causes an undesirable effect during the manual and automatic steering of the steering wheel 12. In view of this respect, the tractor 1 is equipped with the heat supply unit 30 which is so provided as to supply a heat to the automatic steering mechanism 20.

Even when the tractor 1 is used in a low temperature environment, providing the heat supply unit 30 can give the heat to the grease cased in the gear case 2021 thereby to warm the grease. That is, even in the low temperature environment, the viscosity of the grease in the 2021 gear case can be suppressed from becoming too high. As a result, even in the low temperature environment, the operability of the steering wheel 12 can be suppressed from being reduced. Further, even in the low temperature environment; while avoiding a state where the motor 201 is overloaded, the automatic steering function can be used. The configuration of the present embodiment can improve the convenience of the tractor 1 having the automatic steering function.

It is preferable that at least part of the heat supply unit should be placed in or around the gear mechanism 202. This makes it easier to supply the heat to the gear mechanism 202. This also makes it possible to supply the heat from nearby to the grease filled in the gear case 2021 included in the gear mechanism 202. That is, the heat can be efficiently given to the grease. However, the heat supply unit 30 may be placed at or near the motor 201. This allows the motor 201 to be efficiently heated. That is, the heat supply unit 30 may be so configured as to supply heat to the motor 201.

3-1. First Example

FIG. 4 shows a heat supply unit 30A of a first example. In the present example, the heat supply unit 30A includes an electric heater 31 that is placed on a member included in the automatic steering mechanism 20. The electric heater 31 is flat, for example. In the present example, the electric heater 31 is placed in the gear case 2021. In detail, the electric heater 31 is placed on the outer face of the gear case 2021. The electric heater 31 is placed on the lower face of the lower case 2021*b*. However, the electric heater 31 may be placed inside the gear case 2021. Further, the electric heater 31 may be placed on the outer face of the upper case 2021*a*.

It is preferable that the electric heater 31 should be placed in a state of being capable of easily providing the heat to the grease filled in the gear case 2021. It is preferable that the electric heater 31 should be mounted to the gear case 2021 in direct contact or via a member with good thermal conductivity. Further, it is preferable that the gear case 2021 should be made of a material with good thermal conductivity, such as metal, for example.

The electric heater 31, in its preferable form, is a self-control heater in which the heater itself so operates as to keep a given temperature range. The self-control heater is, for example, a PTC (Positive Temperature Coefficient) heater, which has a characteristic of heating, when current is applied, and increasing resistance. As resistance increases due to the heating, the flowing current decreases thereby to lower the temperature of the heater itself. As the temperature of the heater itself decreases, resistance decreases and current flow increases. Thus, the self-control heater has a self-temperature control action so as to achieve a given temperature range without the need for a special control unit. The electric heater 31, which is configured as the self-control heater, may be so configured as to act in a manner to keep the temperature range of 0° C. to 20° C., for example. Further, the lower limit temperature (for example, 0° C. as described above) of the given temperature range may be, for example, the lower limit temperature of the temperature range in which the viscosity of the grease is assumed not to adversely affect the operability of the steering wheel 12, and may be determined by an experiment. Further, the upper temperature limit of the given temperature range is, for example, higher than the lower temperature limit by 5° C. or more.

Suppose that the tractor 1 is placed in the low temperature environment of below 0° C., for example. In this case, the temperature of and/or around the gear mechanism 202 is also typically below 0° C. That is, the temperature of the electric heater 31 itself, which is placed in the gear case 2021, is also below 0° C. Due to this, the electric heater 31, which is configured as the self-control heater, generates heat. The generated heat supplies heat to the gear case 2021 and warms the gear case 2021. This can warm the grease filled in the gear case 2021. When the temperature of the electric heater 31 itself reaches the upper limit of the given temperature range (for example, 20° C.), the heating of the electric heater 31 stops due to a decrease in the current flowing through the electric heater 31.

As can be seen from the above, in the present example, the electric heater 31 starts supplying heat when the temperature of the automatic steering mechanism 20 is less than a first temperature. The heat supplied by the electric heater 31 warms the automatic steering mechanism 20. In detail, the electric heater 31 starts supplying heat when the temperature around the gear mechanism 202 is less than the first temperature. The heat supplied by the electric heater 31 warms the gear mechanism 202, making it possible to suppress the grease viscosity from increasing. Further, the first temperature is, for example, the lower limit temperature of the temperature range in which the viscosity of the grease is assumed not to adversely affect the operability of the steering wheel 12.

Further, the electric heater 31 stops supplying the heat when, after start of the heat supply, the temperature of the automatic steering mechanism is a second temperature higher than the first temperature. The difference between the first and second temperatures is, for example, 5° C. or more. Creating the above configuration can suppress the automatic steering mechanism 20 from being unnecessarily warmed. Creating the above configuration allows for low power consumption.

In the configuration where the electric heater 31 is used for supplying the heat, as in the present example, it is desirable to increase, in view of the use of electric heater 31, the amount of electricity generated by the engine 3.

In the present example, the temperature of the automatic steering mechanism 20 is estimated using the electric heater 31 which is configured as the self-control heater. Thus, the temperature of the automatic steering mechanism 20 may be, not only the temperature acquired by directly measuring the temperature of the member included in the automatic steering mechanism 20, but may be a temperature estimated by using temperature information acquired from around the automatic steering mechanism 20.

Further, the electric heater 31 included in the heat supply unit 30A may be a heater other than the self-control heater. In this case, the electric heater 31 may be so configured as to be controlled on or off in response to information from a temperature sensor that directly or indirectly measures the temperature of the automatic steering mechanism 20.

In the configuration where the temperature of the automatic steering mechanism 20 is directly measured thereby to control the electric heater 31 on/off, the temperatures of the motor 201 and gear mechanism 202, for example, may be directly measured. In the above configuration, for example, it may be so configured that the electric heater 31 is turned on when the temperature of the automatic steering mechanism 20 is determined to be less than the first temperature (for example, 0° C.) by the temperature information acquired from the temperature sensor, and the electric heater 31 is turned off when the temperature is determined to be the second temperature (for example, 20° C.) or more.

Further, in the configuration where the temperature of the automatic steering mechanism 20 is indirectly measured thereby to control the electric heater 31 on/off, the automatic steering mechanism 20's temperature such as an external air temperature and an in-cabin temperature may be measured, for example. In the above configuration, for example, the electric heater 31 may be turned on when the temperature of the automatic steering mechanism 20 is estimated to be less than the first temperature (for example, 0° C.) by the temperature information acquired from the temperature sensor, and the electric heater 31 is turned off after an elapse of a given time. The given time is, for example, the time that the grease filled in the gear case 2021 can be sufficiently warmed, and may be determined by an experiment or the like. The given time may be changed according to the estimated temperature of the automatic steering mechanism 20, and may be longer the lower the temperature.

Figure 6:
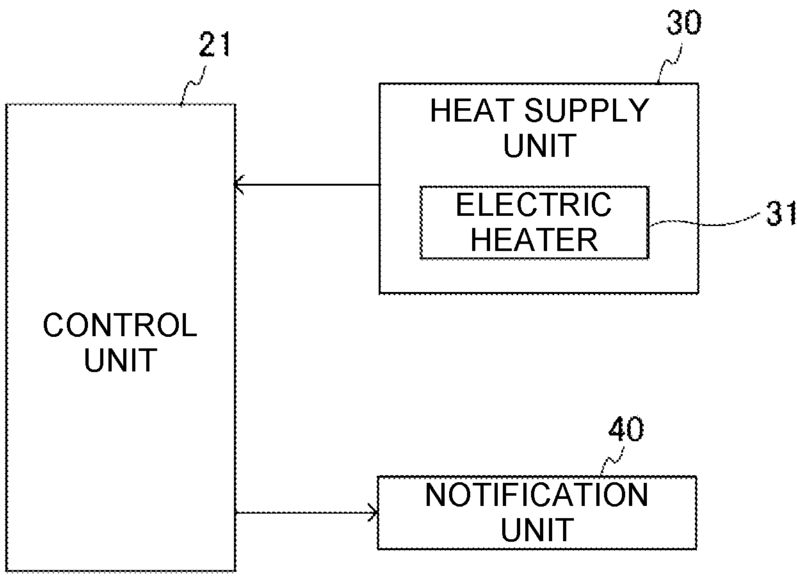
FIG. 6 is a block diagram showing a schematic configuration of a control system of the tractor equipped with a heat supply unit of a first embodiment.

FIG. 6 is a block diagram showing the schematic configuration of a control system of the tractor 1 equipped with the heat supply unit 30A of the first embodiment. As shown in FIG. 6, the control unit 21 is so provided as to acquire action information of the electric heater 31 included in the heat supply unit 30A. The action information may be, for example, energization information, and in detail, current value information.

The control unit 21 performs various control processes according to the state of the heat supply unit 30A. For example, the various control processes may include a process related to whether or not the automatic steering function is enabled. For example, the various control processes may include a notification process that notifies the user of the action state of the heat supply unit 30A and whether or not the automatic steering function is enabled. A notification unit 40, according to the notification process in the control unit 21, properly performs a notification of contents to be given to the driver of the tractor 1, etc. The notification using the notification unit 40 is not essential.

The notification unit 40 may be, for example, a display unit that displays the contents of the notification on a screen. The notification unit 40 may be, for example, an audio output unit that announces the contents of the notification. Further, the notification unit 40 may be a light-emitting unit that emits light to performs a notification of the contents of the notification, or a vibration-generating unit that vibrates to performs a notification of the contents of the notification. For example, the notification unit 40 may be at least one of the following configurations: being provided in the vehicle body 2 of the tractor 1 or being provided in a portable communication terminal (not shown) communicatable with the tractor 1.

Figure 7:
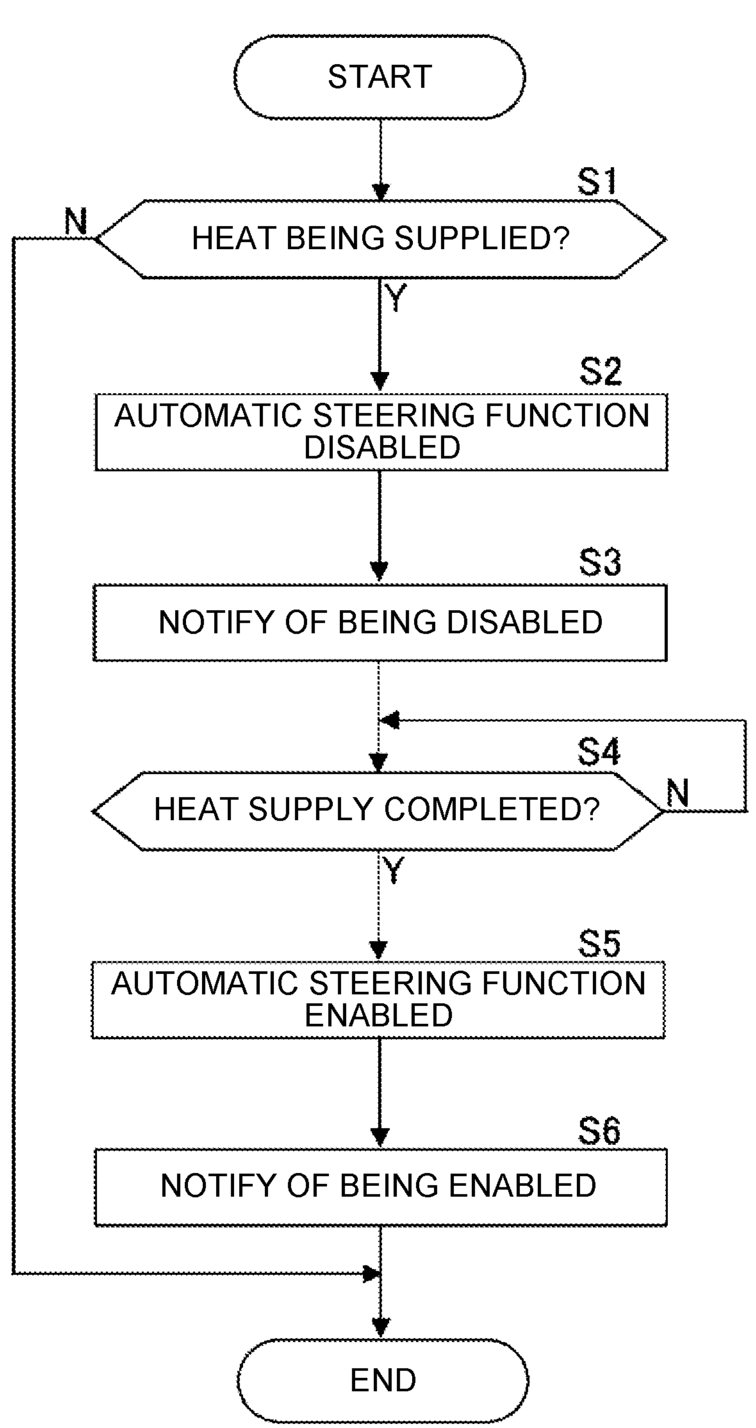
FIG. 7 is a flowchart showing an example of a control process performed by a control unit in the tractor equipped with the heat supply unit of the first embodiment.

FIG. 7 is a flowchart showing an example of a control process performed by the control unit 21 in the tractor 1 equipped with the heat supply unit 30A of the first embodiment. The control process shown in FIG. 7 is started, for example, when the tractor 1 engine 3 is started. Upon starting of the engine 3, the electric heater 31, which is configured as the self-control heater, is automatically placed in an action state (power on).

In step S1, the control unit 21 determines whether or not heat is being supplied by the heat supply unit 30A. Whether or not heat is being supplied can be determined, for example, by acquiring the current value of the electric heater 31. When it is determined that the heat is being supplied (Yes in step S1), the process proceeds to the next step S2. When it is determined that heat is not being supplied (No in step S1), the flow shown in FIG. 7 is ended.

In step S2, the control unit 21 determines to disable the automatic steering function. Once the above determination is made, the automatic steering does not start even when the driver or the like gives an instruction to start the automatic steering. Also, an automatic drive using the automatic steering function is not automatically started. That is, the automatic steering function is disabled while heat is being supplied by the heat supply unit 30A. This can prevent the automatic steering from being performed with the grease viscosity being high. That is, a large load on the motor 201 can be prevented. When the determination is made to disable the automatic steering function, the process proceeds to the next step S3.

In step S3, the control unit 21 controls the notification unit 40, thereby to notify the driver or the like that the automatic steering function is disabled. For example, the screen shows that the automatic steering function is disabled. Also, for example, voice guidance will be given that the automatic steering function is disabled. In addition to, or instead of, the disability of the automatic steering, the fact that the automatic steering mechanism 20 is heated by the heat supply unit 30A may be notified. Once the notification process is performed, the process proceeds to the next step S4.

In step S4, the control unit 21 monitors the completion of heat supply by the heat supply unit 30A. Whether or not the heat supply is completed can be determined, for example, by acquiring the current value of the electric heater 31. When it is determined that the heat supply is completed (Yes in step S4), the process proceeds to the next step S5. When it is determined that the heat supply is not completed (No in step S4), the monitoring in step S4 continues.

In step S5, the control unit 21 determines to enable the automatic steering function. Once the above determination is made, the driver or the like can start the automatic steering. Further, the automatic drive using the automatic steering function can be automatically started. Once it is determined that the automatic steering function is enabled, the process proceeds to the next step S6.

In step S6, the control unit 21 so controls the notification unit 40 as to perform the notification process to notify that the automatic steering function is enabled. For example, the screen shows that the automatic steering function is enabled. Further, for example, voice guidance that the automatic steering function is enabled is provided. In addition to, or instead of, the ability of the automatic steering, the fact that the process of warming the automatic steering mechanism 20 by the heat supply unit 30A is complete may be notified.

Upon completion of step S6, the process shown in FIG. 7 is ended. After the ending of the process shown in FIG. 7, the process from step S1 onward shown in FIG. 7 may be repeated again.

3-2. Second Embodiment

Figure 8:
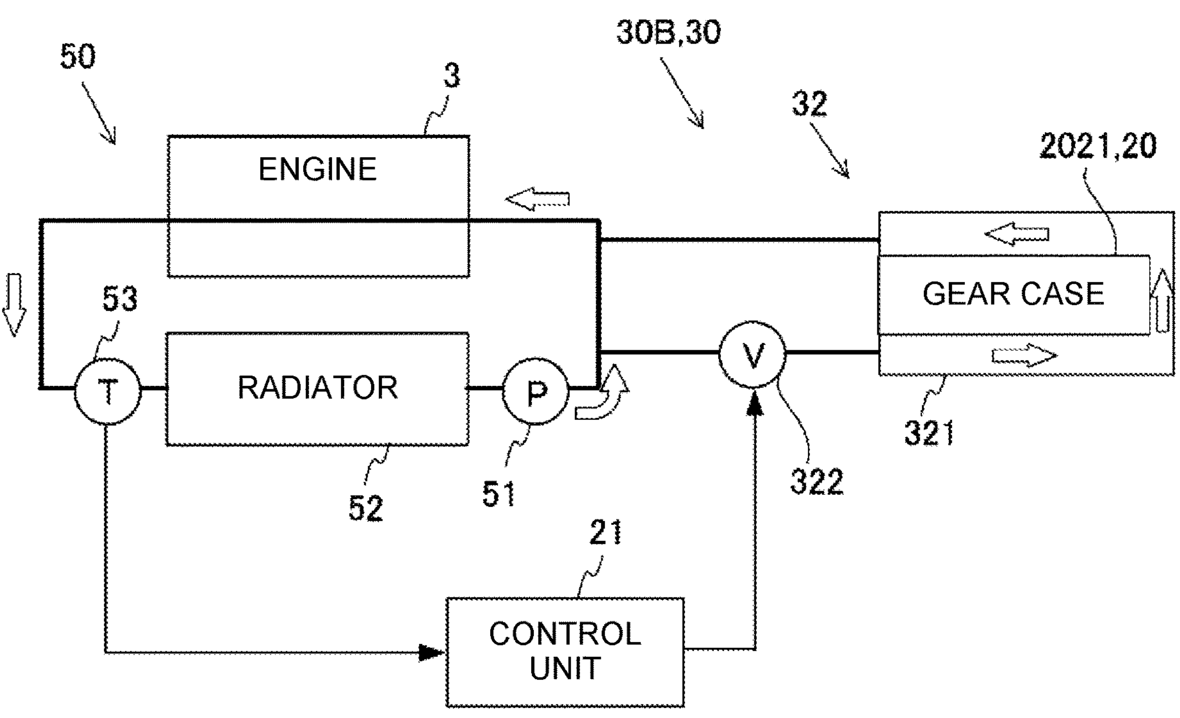
FIG. 8 is a block diagram showing a schematic configuration of the heat supply unit of a second embodiment.

FIG. 8 is a block diagram showing the schematic configuration of a heat supply unit 30B of a second embodiment. In FIG. 8, a thick black line shows a route through which the fluid flows. Further, a white arrow shows the direction of fluid flow.

As shown in FIG. 8, the heat supply unit 30B includes a fluid conveyance mechanism 32 that conveys the fluid to the automatic steering mechanism 20. The heat supply unit 30B conveys the fluid using the fluid conveyance mechanism 32 thereby to supply the heat to the automatic steering mechanism 20. In the present example, the fluid conveyance mechanism 32 uses a cool liquid circulation mechanism 50, which circulates the cool liquid that cools the engine 3, thereby to convey the cool liquid to the automatic steering mechanism 20. That is, in the present example, the fluid conveyed by the fluid conveyance mechanism 32 is a cool liquid for cooling the engine (hereinafter referred to as "engine cool liquid"). The engine cool liquid may be, for example, water. Using the engine cool liquid makes it possible to configure the heat supply unit 30B by using the configuration already provided in the tractor 1, thus making it possible to reduce as much as possible an added new part, etc.

In the present example, the fluid conveyed by the fluid conveyance mechanism 32 is the engine cool liquid, but this is an exemplification. The fluid conveyed by the fluid conveyance mechanism 32 may be a gas rather than a liquid. The fluid conveyance mechanism 32 may be so configured as to take out the exhaust air in the engine 3 or the warm air produced by an air conditioning system and then convey the heat supply gas to the automatic steering mechanism 20.

As shown in FIG. 8, the cool liquid circulation mechanism 50 drives a pump 51 thereby to circulate the engine cool liquid. The engine cool liquid heated by the engine 3 is cooled by a radiator 52, and is sent again to the engine 3 thereby to cool the engine 3. Further, the cool liquid circulation mechanism 50 has a cool liquid temperature sensor 53 that measures the temperature of the engine cool liquid. The engine cool liquid that is cold at the start of the engine 3 usually increases in temperature as time passes from the start of the engine 3.

The fluid conveyance mechanism 32, from the cool liquid circulation mechanism 50, takes out the engine cool liquid circulated in the cool liquid circulation mechanism 50, and conveys the engine cool liquid to the automatic steering mechanism 20. Then, to the cool liquid circulation mechanism 50, the fluid conveyance mechanism 32 returns the engine cool liquid having been used as a source of heat supply for the automatic steering mechanism 20. In detail, the fluid conveyance mechanism 32 includes a jacket 321 and a valve 322.

The jacket 321 is so provided as to jacket at least part of the member included in the automatic steering mechanism 20. In the present example, the jacket 321 is so provided as to jacket at least part of the gear case 2021. The jacket 321 has an inside having a flow route for the engine cool liquid. The valve 322 switches a state of conveying and a state of not conveying the engine cool liquid by the fluid conveyance mechanism 32. The convey state occurs when the valve 322 is open, and the non-convey state occurs when the valve 322 is closed. The valve 322 includes a solenoid valve or the like, and is so provided as to be controlled by the control unit 21 for opening and closing.

Figure 9:
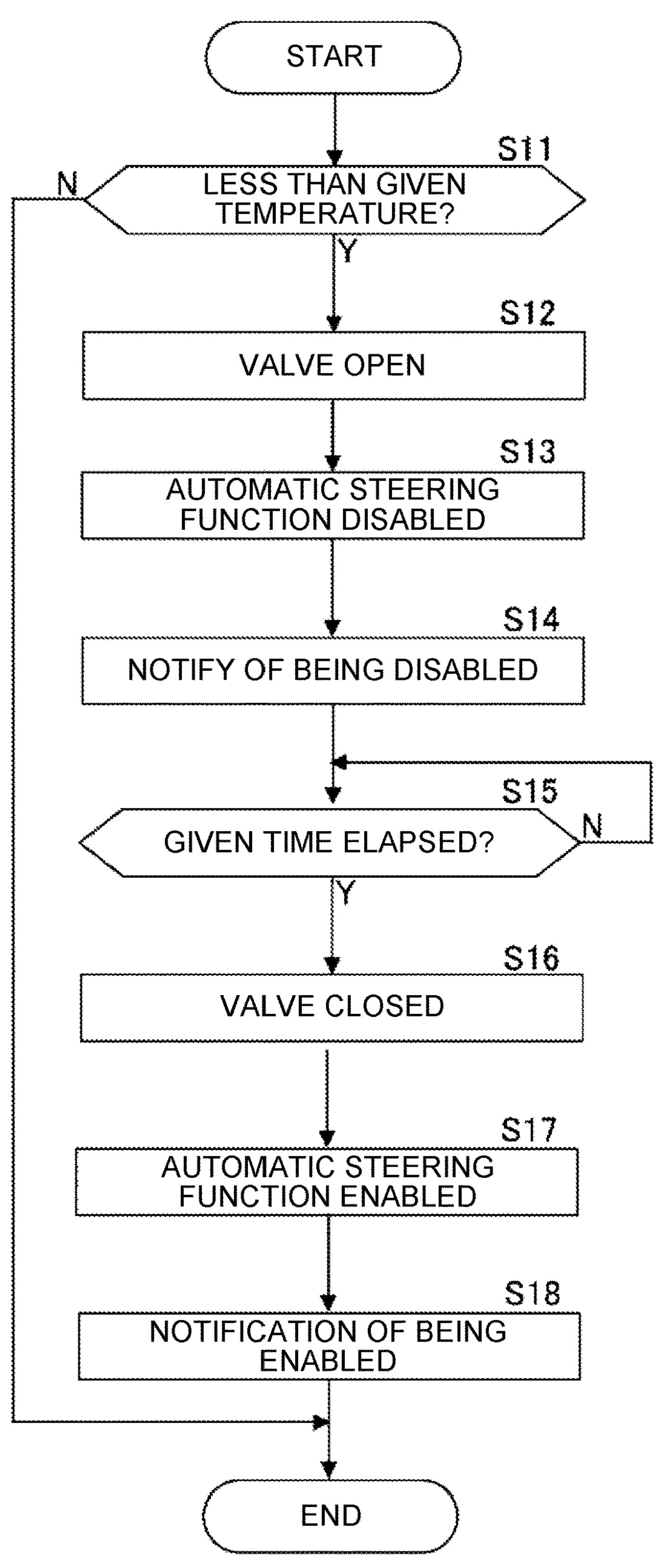
FIG. 9 is a flowchart showing an example of the control process performed by the control unit in the tractor equipped with the heat supply unit of the second embodiment.

FIG. 9 is a flowchart showing an example of the control process performed by the control unit 21 in the tractor 1 equipped with the heat supply unit 30B of the second embodiment. The control process shown in FIG. 9 is started, for example, when the tractor 1 engine 3 is started.

In step S11, the control unit 21 determines whether or not the temperature input from the cool liquid temperature sensor 53 is less than a given temperature. The given temperature may be, for example, the lower limit temperature of the temperature range in which the viscosity of the grease is assumed not to adversely affect the operability of the steering wheel 12, and may be determined by an experiment or the like. The given temperature may be, for example, 0° C. In the present example, the temperature of the cool liquid temperature sensor 53 is used as an estimated value of the temperature of the automatic steering mechanism 20. However, instead of the temperature of the cool liquid temperature sensor 53, the temperature of and/or around the member included in the automatic steering mechanism 20 may be used. When the temperature of the cool liquid temperature sensor 53 is less than the given temperature (Yes in step S11), the process proceeds to the next step S12. When the temperature of the cool liquid temperature sensor 53 is more than or equal to the given temperature (No in step S11), the flow shown in FIG. 9 is ended.

In step S12, the control unit 21 controls the valve 322, thereby to put the valve 322 in an open state. Opening of the valve 322 flows the engine cool liquid through in the jacket 321. This starts the heat supply to the gear case 2021 from the engine cool liquid which is gradually warmed by the start of the engine 3. That is, when the temperature of the automatic steering mechanism 20 is less than the given temperature, the fluid conveyance mechanism 32 starts conveying the fluid for supplying heat. In the present example, the temperature of the automatic steering mechanism 20 is an estimated value, as described above. However, the temperature of the automatic steering mechanism 20 may be an actual measured value acquired by measuring the temperature of the member included in the automatic steering mechanism 20. Once the valve 322 is put in an open state, the process proceeds to the next step S13. In step S13, the control unit 21 determines to disable the automatic steering function. The explanation about the process of step S13 is the same as that about the process in step S2 in FIG. 7 of the first embodiment, thus omitting details. When the determination is so made as to disable the automatic steering function, the process proceeds to the next step S14.

In step S14, the control unit 21 controls the notification unit 40 (see FIG. 6), thereby to performs a notification that the automatic steering function is disabled. The explanation about the process in step S14 is the same as that about the process in step S3 in FIG. 7 of the first embodiment, thus omitting details. Once the notification process is performed, the process proceeds to the next step S15.

In step S15, the control unit 21 monitors an elapse of a given time. The given time is, for example, the time in which the grease filled in the gear case 2021 can be sufficiently warmed by the heat supply using the engine cool liquid, and may be properly determined by an experiment or the like. The given time may be changed, for example, according to the temperature acquired using the cool liquid temperature sensor 53, and may be longer the lower the above temperature is. When it is determined that the given time has elapsed (Yes in step S15), the process proceeds to the next step S16. When it is determined that the given time is yet to elapse (No in step S15), the monitoring in step S15 continues.

In step S16, the control unit 21 controls the valve 322, thereby to put the valve 322 in a closed state. Closing of the valve 322 stops conveying the engine cool liquid used for the heat supply. That is, the fluid conveyance mechanism 32, after an elapse of a given time from the starting of conveying of the fluid, stops conveying the fluid. The stop of fluid conveyance stops the heat supply. At the timing when the valve 322 is closed, the grease filled in the gear case 2021 is sufficiently warmed, thereby to provide a good operability of the steering wheel 12. Once the valve 322 is closed, the process proceeds to the next step S17.

In step S17, the control unit 21 determines to enable the automatic steering function. The explanation about the process of step S17 is the same as that about the process of step S5 in FIG. 7 of the first embodiment, thus omitting details. When it is determined that the automatic steering function is enabled, the process proceeds to the next step S18.

In step S18, the control unit 21 controls the notification unit 40, thereby to perform the notification process to notify that the automatic steering function is enabled. The explanation about the process of step S18 is the same as that about step S6 in FIG. 7 of the first embodiment, thus omitting details. Upon completion of step S18, the process shown in FIG. 9 is ended. After the ending of the process shown in FIG. 9, the process from step S1 onward shown in FIG. 9 may be repeated again.

In the present example, it may be so configured that when the engine cool liquid has a high temperature, the conveying of the engine cool liquid by the fluid conveyance mechanism 32 is automatically stopped. Here, the high temperature refers to a temperature extremely higher than the given temperature (for example, 0° C.), for example, more than or equal to 80° C.

4. MODIFIED EXAMPLES

4-1. First Modified Example

In the above, the heat supply unit 30 is so configured as to include only one of the electric heater 31 and the fluid conveyance mechanism 32. However, the heat supply unit 30 may be so configured as to include the electric heater 31 and the fluid conveyance mechanism 32.

Figure 10:
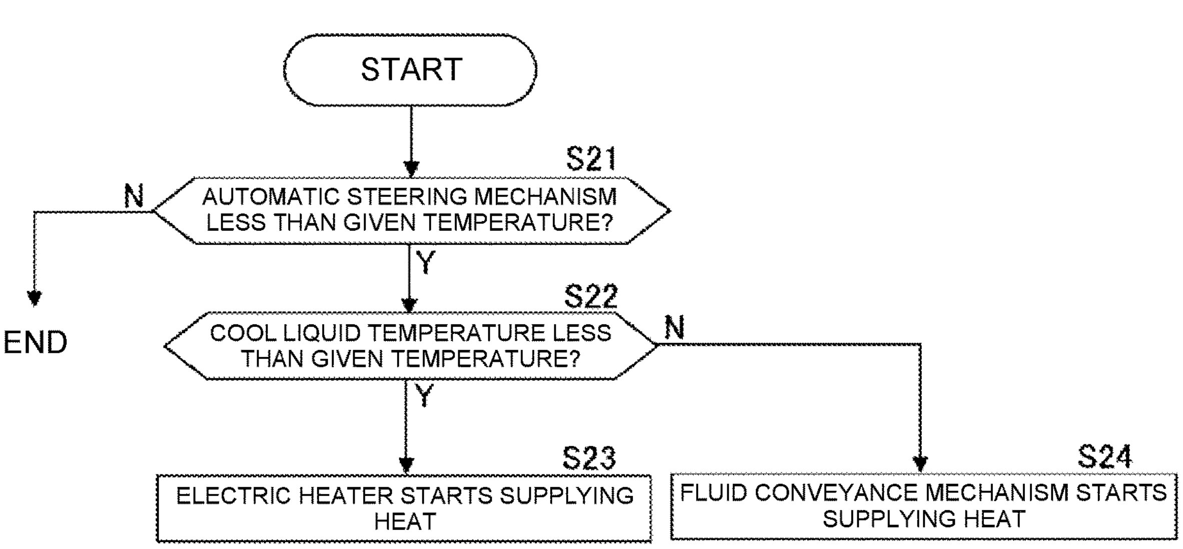
FIG. 10 is a flowchart exemplifying a method of separate use in the case of the heat supply unit including an electric heater and a fluid conveyance mechanism.

FIG. 10 is a flowchart exemplifying a method of separate use in the case of the heat supply unit 30 including the electric heater 31 and the fluid conveyance mechanism 32. The flow shown in FIG. 10 is started, for example, when the engine 3 of the tractor 1 is started. In the present modified example, the electric heater 31 is not immediately put into action (turned on) by the start of the engine 3.

In step S21, the control unit 21 determines whether or not the temperature of the automatic steering mechanism 20 is less than the given temperature. As in the second embodiment above, the given temperature may be the lower limit temperature of the temperature range in which the viscosity of the grease is assumed not to adversely affect the operability of the steering wheel 12, such as 0° C. The temperature of the automatic steering mechanism 20 may be acquired, for example, from a temperature sensor that directly measures the temperature of the member included in the automatic steering mechanism 20 such as the motor 201 and gear mechanism 202. Further, the temperature of the automatic steering mechanism 20 may be acquired, for example, by a temperature sensor that can estimate the automatic steering mechanism temperature such as the external air temperature and the in-cabin temperature. When the temperature of the automatic steering mechanism is less than the given temperature (Yes in step S21), the process proceeds to the next step S22. When the temperature of the automatic steering mechanism 20 is more than or equal to the given temperature (No in step S21), the heat supply by the heat supply unit 30 is unnecessary, thus ending the flow shown in FIG. 10.

In step S22, the control unit 21 determines whether or not the temperature acquired from the cool liquid temperature sensor 53 is less than the given temperature. When the temperature is less than the given temperature (Yes in step S22), the process proceeds to the next step S23. When the temperature is more than or equal to the given temperature (No in step S22), the process proceeds to step S24.

In step S23, the electric heater 31 is turned on, thereby to start the heat supply using the electric heater 31. The process thereafter may be similar to the process shown in FIG. 7. In step S24, the heat supply using the fluid conveyance mechanism 32 is started. The process thereafter may be the same as the process after step S12 shown in FIG. 9.

That is, in the present modified example, when the temperature of the fluid is less than the given temperature, heat is supplied using the electric heater 31, and when the temperature of the fluid is more than or equal to the given temperature, heat is supplied using the fluid conveyance mechanism 32. The above separate use can efficiently supply the heat to the automatic steering mechanism 20 in the low temperature environment.

4-2. Second Modified Example

Figure 11:
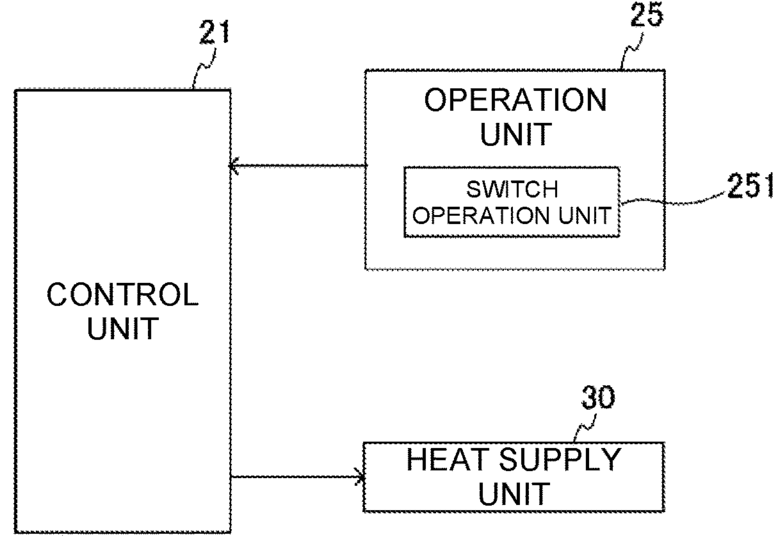
FIG. 11 is a block diagram for explaining about a second modified example of the tractor equipped with the heat supply unit.

FIG. 11 is a block diagram for explaining about a second modified example of the tractor 1 equipped with the heat supply unit 30. In the present modified example, the operation unit 25 for the operator, such as the driver, to input an instruction has a switch operation unit 251 that makes a switching from a state of manually operating the steering wheel 12 to a standby state waiting the automatic steering to start. That is, the tractor 1 of the present modified example is equipped with the switch operation unit 251 that makes the switching from the state of manually operating the steering wheel 12 to the standby state waiting the automatic steering to start. The standby state may be a preparatory period for the switching from manual to automatic. In the standby state, the above points A and B (see FIG. 3) may be provided for registration, for example. Further, in the standby state, another setting related to the automatic steering may be provided.

Further, the operation unit 25 including the switch operation unit 251 may be at least one of the followings: a configuration provided in the vehicle body 2 of the tractor 1, and a configuration provided in a portable communication terminal (not shown) communicatable with the tractor 1. The switch operation unit 251 may be any of a hard switch and a soft switch.

In the configuration where the above switch operation unit 251 is provided, it may be so configured that the heat supply unit 30 starts supplying heat when the switch operation unit 251 is so operated as to make a switching to the standby state. In detail, it is preferable that the heat supply by the heat supply unit 30 should be started when the temperature of the automatic steering mechanism 20 is less than the given temperature (such as 0° C.).

Further, the heat supply unit 30 of the present modified example may be, for example, the heat supply unit 30A of the first embodiment or the heat supply unit 30B of the second embodiment. Further, in the present modified example as well, when the heat is being supplied using the heat supply unit 30, the above fact and the fact that the automatic steering using the automatic steering function cannot be started may be notified by the notification unit 40.

4-3. Third Modified Example

Figure 12:
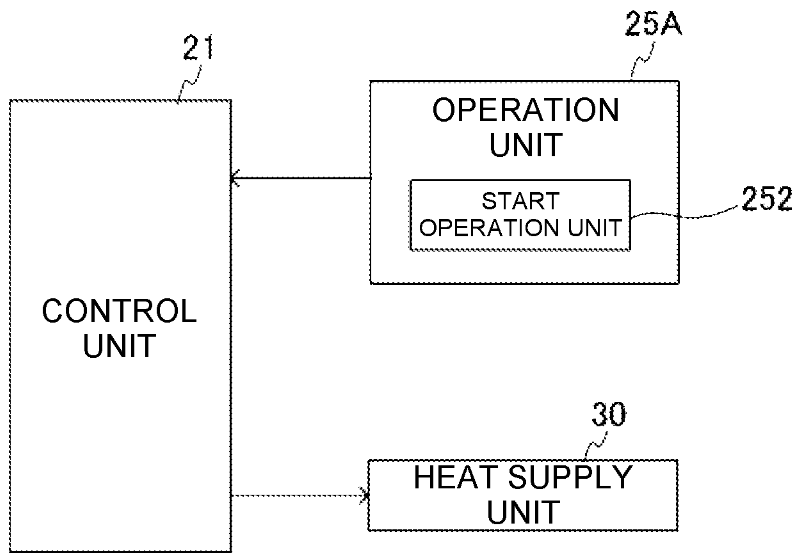
FIG. 12 is a block diagram for explaining about a third modified example of the tractor equipped with the heat supply unit.

FIG. 12 is a block diagram showing a third modified example of the tractor 1 equipped with the heat supply unit 30. In the present modified example, an operation unit 25A for the operator, such as the driver, to input the instruction has a start operation unit 252 that makes it possible to give an instruction for starting the heat supply by the heat supply unit 30. That is, the tractor 1 of the present modified example is equipped with the start operation unit 252 that makes it possible to give the instruction for starting the heat supply by the heat supply unit 30. An operation of the start operation unit 252 causes the heat supply unit 30 to start supplying heat. Creating the above configuration can freely warm the automatic steering mechanism 20 at the timing when the operator, such as the driver, feels necessary.

Further, the operation unit 25 including the start operation unit 252 may be at least one of the followings: a configuration provided in the vehicle body 2 of the tractor 1, and a configuration provided in a portable communication terminal (not shown) communicatable with the tractor 1. Further, the start operation unit 252 may be any of a hard switch and a soft switch. It is preferable that the start operation unit 252, which is configured as the hard switch, should be provided at the steering wheel 12 or the steering column 13.

Further, the heat supply unit 30 of the present modified example may be, for example, the heat supply unit 30A of the first embodiment, the heat supply unit 30B of the second embodiment, and so on. Further, in the present modified example as well, when the heat is being supplied using the heat supply unit 30, the above fact and the fact that the automatic steering using the automatic steering function cannot be started may be notified by the notification unit 40.

Also, in the present modified example as well, the heat supply by the heat supply unit 30 may be on the condition that the temperature of the automatic steering mechanism 20 is less than the first temperature (see first embodiment; for example, 0° C., etc.). That is, it may be so configured that heat is not supplied by the heat supply unit 30 even when the start operation unit 252 is operated in the case of the temperature of the automatic steering mechanism 20 being more than or equal to the first temperature. Further, in the above configuration, when the temperature of the automatic steering mechanism 20 is less than the first temperature, the notification may be given to prompt an operation of the start operation unit 252. Further, when the temperature of the automatic steering mechanism 20 is more than or equal to the first temperature, the notification may be given to notify of disability of the start operation unit 252. Further, when the temperature of the automatic steering mechanism 20 is the second temperature (see the first embodiment; for example, 20° C., etc.) after the start operation unit 252 is operated thereby to start the heat supply by the heat supply unit 30, the notification may be given to prompt the stop of the heat supply by the heat supply unit 30.

Further, it may be so configured that the operation of the start operation unit 252 is permitted on the condition that the above operation of the switch operation unit 251 (see FIG. 11) has made the switching to the standby state. In this case as well, it may be so configured that the operation of the start operation unit 252 is permitted on the condition that the temperature of the automatic steering mechanism 20 is less than the first temperature (see first embodiment; for example, 0° C.). No permission of the operation by the start operation unit 252 may be notified. Further, permission of the operation by the start operation unit 252 may be notified at the time point of the above permission.

5. NOTES, ETC.

Various technical features disclosed in the present specification can be changed in various ways without departing from the spirit of the technical creation thereof. Further, the multiple embodiments and modified examples shown in the present specification may be combined with each other within an allowable range.

6. APPENDICES

An exemplary work vehicle of the present invention may be so configured as to include: a steering wheel; an automatic steering mechanism that enables an automatic steering of the steering wheel; and a heat supply unit so provided as to supply heat to the automatic steering mechanism (First Configuration).

The work vehicle of the first configuration may be so configured as to include: a steering shaft that supports the steering wheel, wherein it may be so configured that the automatic steering mechanism has: a motor, and a gear mechanism that transmits rotary power of the motor to the steering shaft, and at least part of the heat supply unit is placed in or around the gear mechanism (Second Configuration).

In the work vehicle of the first or second configuration, it may be so configured that the heat supply unit includes an electric heater placed in a member included in the automatic steering mechanism, and the electric heater starts supplying the heat when a temperature of the automatic steering mechanism is less than a first temperature (Third Configuration).

In the work vehicle of the third configuration, it may be so configured that the electric heater stops supplying the heat when the temperature of the automatic steering mechanism, after the starting of the supply of the heat, is a second temperature higher than the first temperature (Fourth Configuration).

In the work vehicle of the first or second configuration, it may be so configured that the heat supply unit includes a fluid conveyance mechanism that conveys a fluid to the automatic steering mechanism, and when a temperature of the automatic steering mechanism is less than a given temperature, the fluid conveyance mechanism starts conveying the fluid for supplying the heat (Fifth Configuration).

In the work vehicle of the fifth configuration, it may be so configured that the fluid conveyance mechanism, after an elapse of a given time from the starting of the conveying of the fluid, stops conveying the fluid (Sixth Configuration).

In the work vehicle of the fifth or sixth configuration, it may be so configured that the fluid conveyed by the fluid conveyance mechanism is a cool liquid for cooling an engine (Seventh Configuration).

In the work vehicle of the first configuration, it may be so configured that the heat supply unit includes: an electric heater placed on a member included in the automatic steering mechanism, and a fluid conveyance mechanism that conveys a fluid to the automatic steering mechanism, when a temperature of the fluid is less than a given temperature, the heat is supplied using the electric heater, and when the temperature of the fluid is more than or equal to the given temperature, the heat is supplied using the fluid conveyance mechanism (Eighth Configuration).

In the work vehicle of any of the first to eighth configurations, it may be so configured that the automatic steering is disabled while the heat is being supplied by the heat supply unit (Ninth Configuration).

The work vehicle of any of the first to ninth configurations may be so configured as to include: a switch operation unit that makes a switching from a state of manually operating the steering wheel to a standby state waiting for the automatic steering to start, wherein it may be so configured that the heat supply unit starts supplying the heat when the switch operation unit is so operated as to make the switching to the standby state (Tenth Configuration).

The work vehicle of any of the first to tenth configurations may be so configured as to include: a start operation unit that makes it possible to give an instruction for starting the heat supply by the heat supply unit, wherein it may be so configured that an operation of the start operation unit causes the heat supply unit to start supplying the heat (Eleventh Configuration).

REFERENCE SIGNS LIST

1 tractor (work vehicle)
3 engine
12 steering wheel
14 steering shaft
20 automatic steering mechanism
30A, 30B heat supply unit
31 electric heater
32 fluid conveyance mechanism
201 motor
202 gear mechanism
251 switch operation unit
252 start operation unit

The invention claimed is:

1. A work vehicle comprising:
a steering wheel;
an automatic steering mechanism that enables an automatic steering of the steering wheel; and
a heat supply unit so provided as to supply heat to the automatic steering mechanism, wherein the heat supply unit includes a fluid conveyance mechanism that conveys a fluid to the automatic steering mechanism.

2. The work vehicle as claimed in claim 1, wherein when a temperature of the automatic steering mechanism is less than a given temperature, the fluid conveyance mechanism starts conveying the fluid for supplying the heat.

3. The work vehicle as claimed in claim 2, wherein the fluid conveyance mechanism, after an elapse of a given time from the starting of the conveying of the fluid, stops conveying the fluid.

4. The work vehicle as claimed in claim 2, wherein the fluid conveyed by the fluid conveyance mechanism is a cool liquid for cooling an engine.

5. The work vehicle as claimed in claim 2, wherein the automatic steering is disabled while the heat is being supplied by the heat supply unit.

6. The work vehicle as claimed in claim 2, including:
a start operation unit capable of giving an instruction for starting the heat supply by the heat supply unit,
wherein an operation of the start operation unit causes the heat supply unit to start supplying the heat.

7. The work vehicle as claimed in claim 2, including:
a steering shaft that supports the steering wheel,
wherein
the automatic steering mechanism has:
a motor, and
a gear mechanism that transmits rotary power of the motor to the steering shaft, and
at least part of the heat supply unit is placed in or around the gear mechanism.

8. The work vehicle as claimed in claim 2, wherein the heat supply unit includes an electric heater placed in a member included in the automatic steering mechanism, and the electric heater starts supplying the heat when a temperature of the automatic steering mechanism is less than a first temperature.

9. The work vehicle as claimed in claim 8, wherein the electric heater subsequently stops supplying the heat when the temperature of the automatic steering mechanism is a second temperature higher than the first temperature.

10. The work vehicle as claimed in claim 1, wherein the heat supply unit includes:
an electric heater placed on a member included in the automatic steering mechanism, and
when a temperature of the fluid is less than a given temperature, the heat is supplied using the electric heater, and when the temperature of the fluid is more than or equal to the given temperature, the heat is supplied using the fluid conveyance mechanism.

11. The work vehicle as claimed in claim 1, including:
a switch operation unit that makes a switching from a state of manually operating the steering wheel to a standby state waiting for the automatic steering to start,
wherein the heat supply unit starts supplying the heat when the switch operation unit is so operated as to make the switching to the standby state.

* * * * *